(12) United States Patent
Malegaonkar et al.

(10) Patent No.: US 8,620,136 B1
(45) Date of Patent: Dec. 31, 2013

(54) SYSTEM AND METHOD FOR MEDIA INTELLIGENT RECORDING IN A NETWORK ENVIRONMENT

(75) Inventors: Ashutosh A. Malegaonkar, Milpitas, CA (US); Didier R. Moretti, Los Altos, CA (US); Satish K. Gannu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 13/098,434

(22) Filed: Apr. 30, 2011

(51) Int. Cl.
*H04N 9/80* (2006.01)

(52) U.S. Cl.
USPC .......................................................... 386/239

(58) Field of Classification Search
USPC .................. 386/200, 239, 247, 248, 292
See application file for complete search history.

(56) References Cited

U.S. PATENT DOCUMENTS

| | | | | |
|---|---|---|---|---|
| 5,613,032 A | * | 3/1997 | Cruz et al. ................... | 386/241 |
| 5,677,901 A | * | 10/1997 | Iwamura ................... | 369/47.31 |
| 5,857,179 A | | 1/1999 | Vaithyanathan et al. | |
| 5,961,582 A | | 10/1999 | Gaines | |
| 6,012,053 A | | 1/2000 | Pant et al. | |
| 6,026,388 A | | 2/2000 | Liddy et al. | |
| 6,301,586 B1 | | 10/2001 | Yang et al. | |
| 6,304,283 B1 | * | 10/2001 | Kitagawa ................... | 348/14.06 |
| 6,345,253 B1 | | 2/2002 | Viswanathan | |
| 6,697,793 B2 | | 2/2004 | McGreevy | |
| 7,017,183 B1 | | 3/2006 | Frey et al. | |
| 7,072,837 B2 | | 7/2006 | Kemble et al. | |
| 7,099,867 B2 | | 8/2006 | Okada et al. | |
| 7,260,312 B2 | * | 8/2007 | Srinivasan et al. ............ | 386/248 |
| 7,292,532 B2 | | 11/2007 | Sakata et al. | |
| 7,350,227 B2 | | 3/2008 | McGrew et al. | |
| 7,417,959 B2 | * | 8/2008 | Dorner et al. ................. | 370/260 |
| 7,457,808 B2 | | 11/2008 | Gaussier et al. | |
| 7,493,369 B2 | | 2/2009 | Horvitz et al. | |
| 7,509,491 B1 | | 3/2009 | Wainner et al. | |
| 7,603,350 B1 | | 10/2009 | Guha | |
| 7,698,442 B1 | | 4/2010 | Krishnamurthy et al. | |
| 7,706,265 B2 | | 4/2010 | Monette et al. | |
| 7,809,714 B1 | | 10/2010 | Smith | |
| 7,818,215 B2 | | 10/2010 | King et al. | |
| 7,827,191 B2 | | 11/2010 | Williams | |

(Continued)

FOREIGN PATENT DOCUMENTS

CN 102648464 A 8/2012
EP 2483803 4/2011

(Continued)

OTHER PUBLICATIONS

U.S. Appl. No. 13/182,862, filed Jul. 14, 2011 entitled "System and Method for Deriving User Expertise Based on Data Propagating in a Network Environment," Inventor(s): Satish K. Gannu, et al.

(Continued)

*Primary Examiner* — Tat Chio
(74) *Attorney, Agent, or Firm* — Patent Capital Group

(57) ABSTRACT

A method is provided in one example and includes receiving video data propagating in a network environment; maintaining the video data in a buffer having a predetermined size; generating meta-information associated with the video data; and receiving a recording request from an end user participating in a video session associated with a video data. The recording request triggers the video data to be recorded in the network environment remote from the end user.

20 Claims, 9 Drawing Sheets

(56) References Cited

U.S. PATENT DOCUMENTS

| | | |
|---|---|---|
| 7,853,553 B2 | 12/2010 | Lankinen et al. |
| 7,913,176 B1 | 3/2011 | Blattner et al. |
| 8,015,250 B2 | 9/2011 | Kay |
| 8,051,204 B2 | 11/2011 | Kai et al. |
| 8,214,209 B2 | 7/2012 | Nagatomo |
| 8,255,386 B1 | 8/2012 | Annau et al. |
| 8,260,774 B1 | 9/2012 | Aggarwal |
| 8,374,983 B1 | 2/2013 | Pohl et al. |
| 2002/0032772 A1 | 3/2002 | Olstad et al. |
| 2002/0035605 A1 | 3/2002 | McDowell et al. |
| 2002/0087311 A1 | 7/2002 | Leung Lee et al. |
| 2002/0093915 A1 | 7/2002 | Larson |
| 2003/0014399 A1 | 1/2003 | Hansen et al. |
| 2003/0014448 A1 | 1/2003 | Castellanos et al. |
| 2003/0014586 A1 | 1/2003 | Mitsuda et al. |
| 2003/0028773 A1 | 2/2003 | McGarvey et al. |
| 2003/0028896 A1 | 2/2003 | Swart et al. |
| 2003/0033288 A1 | 2/2003 | Shanahan et al. |
| 2003/0074555 A1 | 4/2003 | Fahn et al. |
| 2003/0093789 A1 | 5/2003 | Zimmerman et al. |
| 2004/0049714 A1 | 3/2004 | Marples et al. |
| 2004/0158609 A1 | 8/2004 | Daniell et al. |
| 2004/0193426 A1 | 9/2004 | Maddux et al. |
| 2004/0208123 A1 | 10/2004 | Sakata et al. |
| 2004/0258396 A1* | 12/2004 | Nakamura et al. ............... 386/83 |
| 2005/0060283 A1 | 3/2005 | Petras et al. |
| 2005/0063352 A1 | 3/2005 | Amara et al. |
| 2005/0068167 A1 | 3/2005 | Boyer et al. |
| 2005/0076198 A1 | 4/2005 | Skomra et al. |
| 2005/0086197 A1 | 4/2005 | Boubez et al. |
| 2005/0102522 A1 | 5/2005 | Kanda |
| 2005/0108001 A1 | 5/2005 | Aarskog |
| 2005/0160166 A1 | 7/2005 | Kraenzel |
| 2005/0272405 A1 | 12/2005 | Tomlinson et al. |
| 2006/0048210 A1 | 3/2006 | Hildre et al. |
| 2006/0150253 A1 | 7/2006 | Feuerstein et al. |
| 2006/0168213 A1 | 7/2006 | Richardson et al. |
| 2006/0224587 A1 | 10/2006 | Zamir et al. |
| 2006/0285493 A1 | 12/2006 | Manuja et al. |
| 2007/0016583 A1 | 1/2007 | Lempel et al. |
| 2007/0106908 A1 | 5/2007 | Miyazaki et al. |
| 2007/0118275 A1 | 5/2007 | Qi et al. |
| 2007/0198725 A1 | 8/2007 | Morris |
| 2007/0206617 A1 | 9/2007 | Andreasen et al. |
| 2007/0239680 A1 | 10/2007 | Oztekin et al. |
| 2007/0239837 A1 | 10/2007 | Jablokov et al. |
| 2007/0244892 A1 | 10/2007 | Narancic |
| 2007/0253682 A1* | 11/2007 | Chang et al. .................. 386/125 |
| 2007/0260684 A1 | 11/2007 | Sharma et al. |
| 2007/0266020 A1 | 11/2007 | Case et al. |
| 2007/0294265 A1 | 12/2007 | Askew et al. |
| 2008/0027981 A1 | 1/2008 | Wahl |
| 2008/0060055 A1 | 3/2008 | Lau |
| 2008/0065892 A1 | 3/2008 | Bailey et al. |
| 2008/0077791 A1 | 3/2008 | Lund et al. |
| 2008/0091670 A1 | 4/2008 | Ismalon |
| 2008/0097985 A1 | 4/2008 | Olstad et al. |
| 2008/0126690 A1 | 5/2008 | Rajan et al. |
| 2008/0140674 A1 | 6/2008 | Ishikawa |
| 2008/0154873 A1 | 6/2008 | Redlich et al. |
| 2008/0184326 A1 | 7/2008 | Nakajima |
| 2008/0222142 A1 | 9/2008 | O'Donnell |
| 2008/0244740 A1 | 10/2008 | Hicks et al. |
| 2008/0295040 A1 | 11/2008 | Crinon |
| 2008/0313144 A1 | 12/2008 | Huston |
| 2009/0006333 A1 | 1/2009 | Jones et al. |
| 2009/0049053 A1 | 2/2009 | Barker et al. |
| 2009/0055175 A1 | 2/2009 | Terrell et al. |
| 2009/0119278 A1 | 5/2009 | Cross et al. |
| 2009/0182727 A1 | 7/2009 | Majko |
| 2009/0196570 A1* | 8/2009 | Dudas et al. .................... 386/52 |
| 2009/0210715 A1 | 8/2009 | Izu et al. |
| 2009/0226870 A1 | 9/2009 | Minotti |
| 2009/0234497 A1 | 9/2009 | Uejo |
| 2009/0234834 A1 | 9/2009 | Cozzi |
| 2009/0254572 A1 | 10/2009 | Redlich et al. |
| 2009/0276377 A1 | 11/2009 | Dutta et al. |
| 2009/0293016 A1 | 11/2009 | Potevin et al. |
| 2009/0319365 A1 | 12/2009 | Waggoner et al. |
| 2009/0327271 A1 | 12/2009 | Amitay et al. |
| 2010/0010968 A1 | 1/2010 | Redlich et al. |
| 2010/0057815 A1 | 3/2010 | Spivack et al. |
| 2010/0088331 A1 | 4/2010 | White et al. |
| 2010/0153855 A1 | 6/2010 | Roberts et al. |
| 2010/0179801 A1 | 7/2010 | Huynh et al. |
| 2010/0223581 A1 | 9/2010 | Manolescu et al. |
| 2010/0223629 A1 | 9/2010 | Appelbaum et al. |
| 2010/0250547 A1 | 9/2010 | Grefenstette et al. |
| 2010/0274815 A1 | 10/2010 | Vanasco |
| 2010/0280985 A1 | 11/2010 | Duchon et al. |
| 2010/0306816 A1 | 12/2010 | McGrew et al. |
| 2011/0077936 A1 | 3/2011 | Arumugam et al. |
| 2011/0078167 A1 | 3/2011 | Sundaresan et al. |
| 2011/0078550 A1 | 3/2011 | Nabutovsky |
| 2011/0099195 A1 | 4/2011 | Patwardhan et al. |
| 2011/0119264 A1 | 5/2011 | Hu et al. |
| 2011/0161409 A1 | 6/2011 | Nair et al. |
| 2011/0173260 A1 | 7/2011 | Biehl et al. |
| 2011/0208522 A1 | 8/2011 | Pereg et al. |
| 2011/0225048 A1 | 9/2011 | Nair |
| 2011/0231296 A1 | 9/2011 | Gross et al. |
| 2011/0252330 A1 | 10/2011 | Catlin et al. |
| 2011/0270709 A1 | 11/2011 | Lewis et al. |
| 2011/0270843 A1 | 11/2011 | Albin |
| 2011/0304685 A1 | 12/2011 | Khedouri et al. |
| 2012/0002544 A1 | 1/2012 | Kokku et al. |
| 2012/0030232 A1 | 2/2012 | John et al. |
| 2012/0046936 A1 | 2/2012 | Kandekar et al. |
| 2012/0081506 A1 | 4/2012 | Marvit |
| 2012/0102050 A1 | 4/2012 | Button et al. |
| 2012/0110087 A1 | 5/2012 | Culver et al. |
| 2012/0185239 A1 | 7/2012 | Goud et al. |
| 2012/0271805 A1 | 10/2012 | Holenstein et al. |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS

Rosella Data Mining & Database Analytics, "Web Search and Web Navigation Pattern Analyzer," 3 pages; printed Jul. 25, 2011; http://222.rosellaadb.com/surf-pattern-analyzer.htm.

Moorthi, Y. L. R., "Have Breakfast or Be Breakfast," Wall Street Journal, Feb. 8, 2010, 2 pages; http://online.wsj.com/article/SB126465641868236415.html#printMode.

Nexidia, "Audio and Speech Analytics Software," 1 page; printed Sep. 30, 2009; http://www.nexidia.com.

NSA Watch, "Other Surveillance Network: Governmental Surveillance Agencies," 2 pages; printed Sep. 30, 2009; http://www.nsawatch.org/networks.html.

Ohl, Ricky, "computer Supported Argument Visualisation: Modeling Wicked Problems," Ph.D. Thesis, Australian Digital These Program, Feb. 2008; 403 pgs.; http://gu.edu.au:8080/adt-root/public/adt-QGU20090724.155249/index.html.

Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.

Smith, Ronnie W., "Performance Measures for the Next Generation of Spoken Natural Language Dialog Systems," pp. 37-40; http://acl.ldc.upenn.edu/WW97/W97-0607.pdf.

Swabey, Pete, "Making the Invisible Visible," 2 pages; Sep. 23, 2009; http://www.trampolinesystems.com/news/in+the+news/archive/2009/59.

Trampoline Systems, "Navigation," 2 pages.; printed Sep. 30, 2009; www.trampolinesystems.com.

(56) References Cited

OTHER PUBLICATIONS

Trent, Jennifer, "Studying Social Tagging and Folksonomy: A Review and Framework," Jan. 2009, 10(1) Journal of Digital Information; 42 pages http://dlist.sir.arizona.edu/arizona/handle/10150/105375.
Wasilewska, Anita, CSE 634—Data Mining: Text Mining; 85 pages; www.cs.sunysb.edu/~cse634/presentations/TextMining.pdf.
WebChoir Products—Personal Vocabulary Tools, "Personal Tools," 1 page; printed Sep. 30, 2009 http://www.webchoir.com/products/ptt.html.
Wikipedia, "Homophone," 3 pages; printed Sep. 30, 2009; http://en.wikipedia.org/wiki/Homophone.
Wikipedia, "International Phonetic Alphabet," 19 pages; printed Sep. 30, 2009; http://en.wikipedia.org/wiki/International_Phonetic_Alphabet.
Wikipedia, "Phoneme," 7 pages; printed Sep. 30, 2009; http://en.wikipedia.org/wiki/Phoneme.
Virage, "Audio Analysis," Autonomy Virage, © 2009 Autonomy Virage, 1 page http://www.virage.com/security-and-surveillance/functions/audio-analysis/index.htm.
Virage, "Understanding Video," Autonomy Virage, © 2009 Autonomy Virage, 5 pages http://www.virage.com/rich-media/technology/understanding-video/index.htm.
U.S. Appl. No. 13/608,787, filed Sep. 10, 2012 entitled "System and Method for Enhancing Metadata in a Video Processing Environment," Inventor(s) Sandipkumar V. Shah, et al.
Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.
Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.
Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.
Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.
Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.
U.S. Appl. No. 13/364,102, filed Feb. 1, 2012 entitled "System and Method for Creating Customized On-Demand Video Reports in a Network Environment," Inventor(s): Deepti Patil, et al.
Lacher, Martin S., et al., "On the Integration of Topic Maps and RDF Data," Extreme Markup Languages 2001, 14 pages.
Wang, Xuerui, et al., "Topics over Time: A NonMarkov Continuous Time Model of Topical Trends," KDD'06, Aug. 20-23, 2006, 10 pages.
U.S. Appl. No. 13/088,974, filed Apr. 18, 2011 entitled "System and Method for Providing Augmented Data in a Network Environment", Inventor(s): Satish K. Gannu et al.
U.S. Appl. No. 13/098,112, filed Apr. 29, 2011 entitled "System and Method for Evaluating Visual Worthiness of Video Data in a Network Environment", Inventor(s): Deepti Patil et al.
PCT Notification of Transmittal (1 page) of the International Search Report (3 pages), and Written Opinion of the International Searching Authority, or the Declaration (6 pages) mailed Jan. 12, 2011 for PCT/US2010/050762.
Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.
Chen, Rung-Ching, et al., "Adding New Concepts on the Domain Ontology Based on Semantic Similarity," International Conference on Business and Information, Jul. 12-14, 2006, XP002514339; 14 pages; http://bai2006.atisr.org./CD/Papers/2006bai6169.pdf.
Sethy, Abhinav, et al., "Building Topic Specific Language Models from Webdata Using Competitive Models," $9^{th}$ European Conference on Speech Communication and Technology, Eurospeech Interspeech 2005 International Speech and Communication Association Fr., 2005, pp. 1293-1296; XP 002614341; http://sail.usc.edu/publications/sethy-euro2005.pdf.
"The LNTS Leap: Phoneme Recognition," 2 pages; printed Sep. 30, 2009; http://www.Intstech.com.
Seher, Indra, "Query Expansion in Personal Queries," IADIAS (International Association for Development of the Information Society) 2006, 5 pages www.iadis.org/Multi2006/papers/16/5023_ISA.
Jiang, Weiliang, et al., "A Method for Personal Query Based on Role Preference Ontology," Industrial Mechanatronics and Automation, ICIMA 2009 International Conference, pp. 479-481; Abstract Only, 1 page.
U.S. Appl. No. 12/471,404, filed Sep. 30, 2009, entitled "System and Method for Generating Personal Vocabulary from Network Data," Inventor(s): Satish K. Gannu, et al.
U.S. Appl. No. 12/571,414, filed Sep. 30, 2009, entitled "System and Method for Providing Speech Recognition Using Personal Vocabulary in a Network Environment," Inventor(s): Satish K. Gannu, et al.
U.S. Appl. No. 12/571,421, filed Sep. 30, 2009, entitled "System and Method for Ensuring Privacy While Tagging Information in a Network Environment," Inventor(s): Satish K. Gannu, et al.
U.S. Appl. No. 12/571,426, filed Sep. 30, 2009, entitled "System and Method for Controlling an Exchange of Information in a Network Environment," Inventor(s): Satish K. Gannu, et al.
U.S. Appl. No. 12/762,194, filed Apr. 16, 2010, entitled "System and Method for Deducing Presence Status from Network Data," Inventor(s): Thangavelu Arumugam, et al.
U.S. Appl. No. 12/778,899, filed May 12, 2010, entitled "System and Method for Deriving User Expertise Based on Data Propagating in a Network Environment," Inventor(s): Virgil N. Mihailovici, et al.
U.S. Appl. No. 12/971,852, filed Dec. 17, 2010, entitled "System and Method for Providing Argument Maps Based on Activity in a Network Environment," Inventor(s) Deepti Patil et al.
U.S. Appl. No. 12/971,946, filed Dec. 17, 2010, entitled "System and Method for Providing Feeds Based on Activity in a Network Environment," Inventor(s) Satish K. Gannu et al.
U.S. Appl. No. 13/088,974, filed Apr. 18, 2011, entitled "System and Method for Providing Augmented Data in a Network Environment," Inventor(s) Satish K. Gannu et al.
U.S. Appl. No. 13/098,112, filed Apr. 29, 2011, entitled "System and Method for Evaluating Visual Worthiness of Video Data in a Network Environment," Inventor(s) Deepti Patil et al.
Hess, Andreas, et al., "Multi-Value Classification of Very Short Texts," 8 pages, printed on May 12, 2010 IDS; http://www.andreas-hess.info/publications/hess-ki08.pdf.
Horvitz, E., et al., "Coordinate: Probabilistic Forecasting of Presence and Availability," 2002, 10 pages; ftp://ftp.research.microsoft.com/pub/ejh/coordinate.pdf.
Kohl, J. and C. Neuman, The Kerberos Network Authentication Service (V5), Network Working Group, RFC 1510, 09.1993, 105 pages; http://www.ietf.org/rfc/rfc1510.
Lancope, "Stealth Watch, Revolutionize the Way You View Your Network," © 2009, 8 pages http://storage.pardot.com/2382/9637/StealthWatch_System_Family_Brochure.pdf.
Montgomery, W. A., et al., "Network Intelligence for Presence Enhanced Communication," Spirits Working Group, May 2002, 9 pages, http://ietfreport.isoc.org/all-ids/draft-montgomery-copeland-presence-spirits-00.txt.
Nortel Networks Wireless Solutions (A. Silver, J. Larkins, D. Stringer), "Unified Network Presence Management," A White Paper, © 2000, 6 pages, www.mobilein.com/UNPM.pdf.
U.S. Appl. No. 13/160,701, filed Jun. 15, 2011 entitled "System and Method for Discovering Videos," Inventor(s) Ashutosh A. Malegaonkar, et al.

(56) References Cited

OTHER PUBLICATIONS

U.S. Appl. No. 13/149,405, filed May 31, 2011 entitled "System and Method for Evaluating Results of a Search Query in a Network Environment," Inventor(s): Satish K. Gannu, et al.
Billi, R., et al., "Interactive Voice Technology at Work: The CSELT Experience," 2nd IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.
Carnegie Mellon University, "Speech at CMU," 4 pages; printed Sep. 30, 2009; http://www.speech.cs.cmu.edu/speech/.
Caslon Analytics Echelon Note: Overview, May 2006, 6 pages; printed Sep. 30, 2009 http://www.caslon.com.au/echelonnote.htm.
Grimes, Seth, "Sentiment Analysis: Opportunities and Challenges," Beye Network; Jan. 22, 2008; 6 pages, http://www.b-eye-network.com/view/6744.
Hess, Andreas, et al., "From Web 2.0 to Semantic Web: A Semi-Automated Approach," 15 pages; printed Sep. 30, 2009; http://www.andreas-hess.info/publications/hess-cisweb08.pdf.
iLogos v1.5 download (win); 4 pages. [Retrieved and printed on May 28, 2010] from http://www.phil.cmu.edu/projects/argument_mapping/.
Jadhav, N.S. and I.N. Dwivedi, "Social computing based personal vocabulary building," 5 pages; printed Sep. 30, 2009; http://www.priorartdatabase.com/IPCOM/000173550/.
Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.
"Click Scoring Relevance Framework," LucidWorks, 7 pages [retrieved and printed May 7, 2012] http://lucidworks.lucidimagination.com/display/lweug/Click+Scoring+Relevance+Framework.
"Google Custom Search," Web Page, Google.com, © 2012 Google, 1 page http://www.google.com/cse/.
"Recommender System," Wikipedia, Apr. 28, 2012; 9 pages http://en.wikipedia.org/wiki/Recommender_system.
"Understanding Metadata," NISO Press, National Information Standards Organization, 2004, 20 pages.
Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.
Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.
Gligorov, User-generated Metadata in Audio-visual Collections, Proceedings of the International World Wide Web Conference, WWW 2012, Apr. 16-20, 2012, Lyon, France (2012); 5 pages.
Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.
Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.
Rodriguez, et al. Automatic Metadata Generation Using Associative Networks, ACM Transactions on Information Systems, vol. 27, No. 2, Article 7, Feb. 2009.
Telestream, Inc. Product Literature, "Extracting and Preparing Metadata to Make Video Files Searchable," Telestream, Inc. 2008; 6 pages.
PCT Apr. 3, 2012 International Preliminary Report on Patentability and Wrtten Opinion of the International Searching Authority from International Application PCT/US2010/050762; 7 pages.
EPO Nov. 7, 2012 Response to Communication pursuant to Rule 161(1) and 162 from European Application No. 10770664; 8 pages.
PCT Oct. 4, 2012 Notification of Transmittal of the International Search Report and Written Opinion of the International Search Authority from Application PCT/US2012/040097; 15 pages.
Bollen, et al., "Usage Derived Recommendations for a Video Digital Library," Journal of Network and Computer Applications, Academic Press, New York, NY, vol. 30, No. 3, Mar. 16, 2007.
Umbrich J., et al., "Four Heuristics to Guide Structured Content Crawling," Eighth International Conference on Web Engineering, 2008, Jul. 14, 2008; © 2008 IEEE DOI 10.1109/ICWE.2008.42.

\* cited by examiner

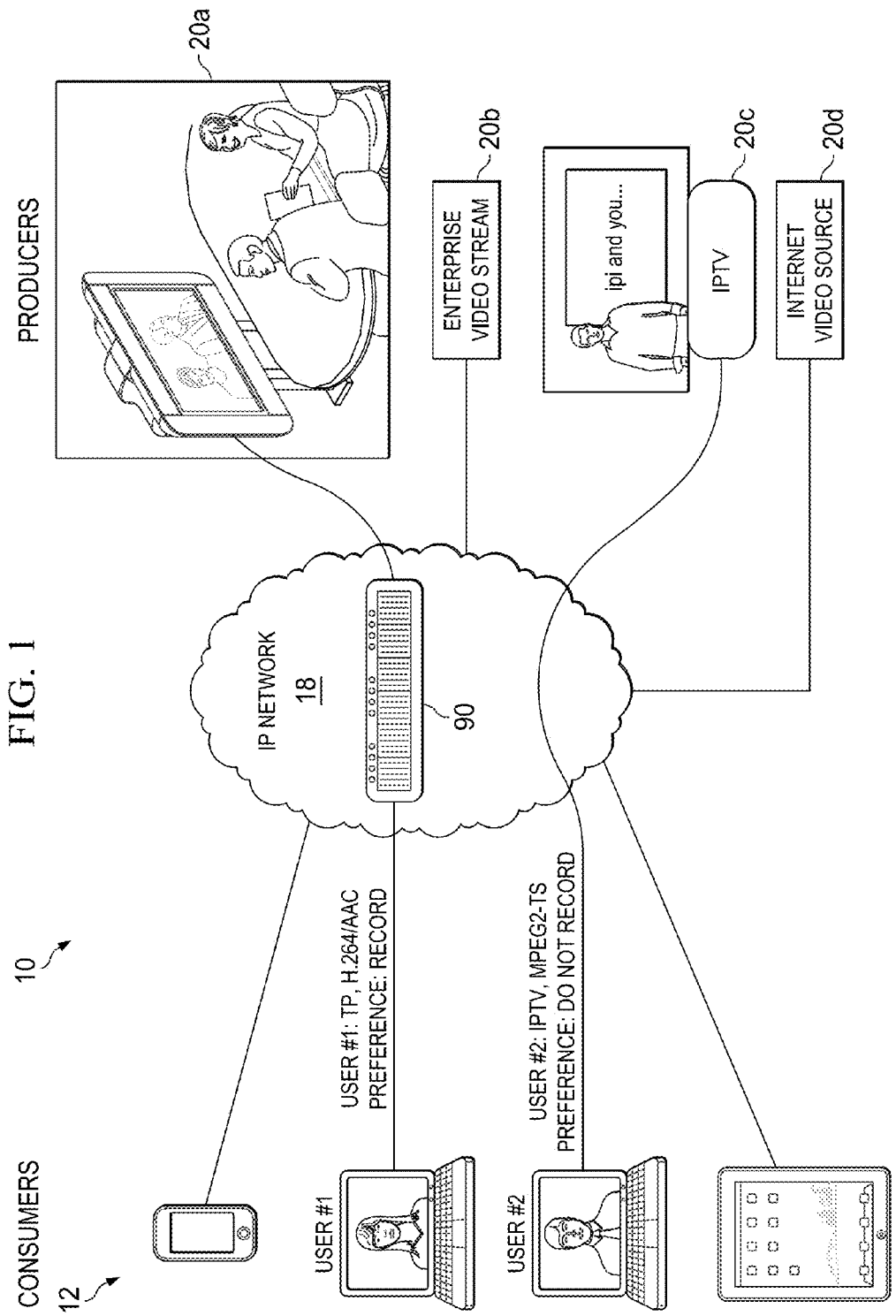

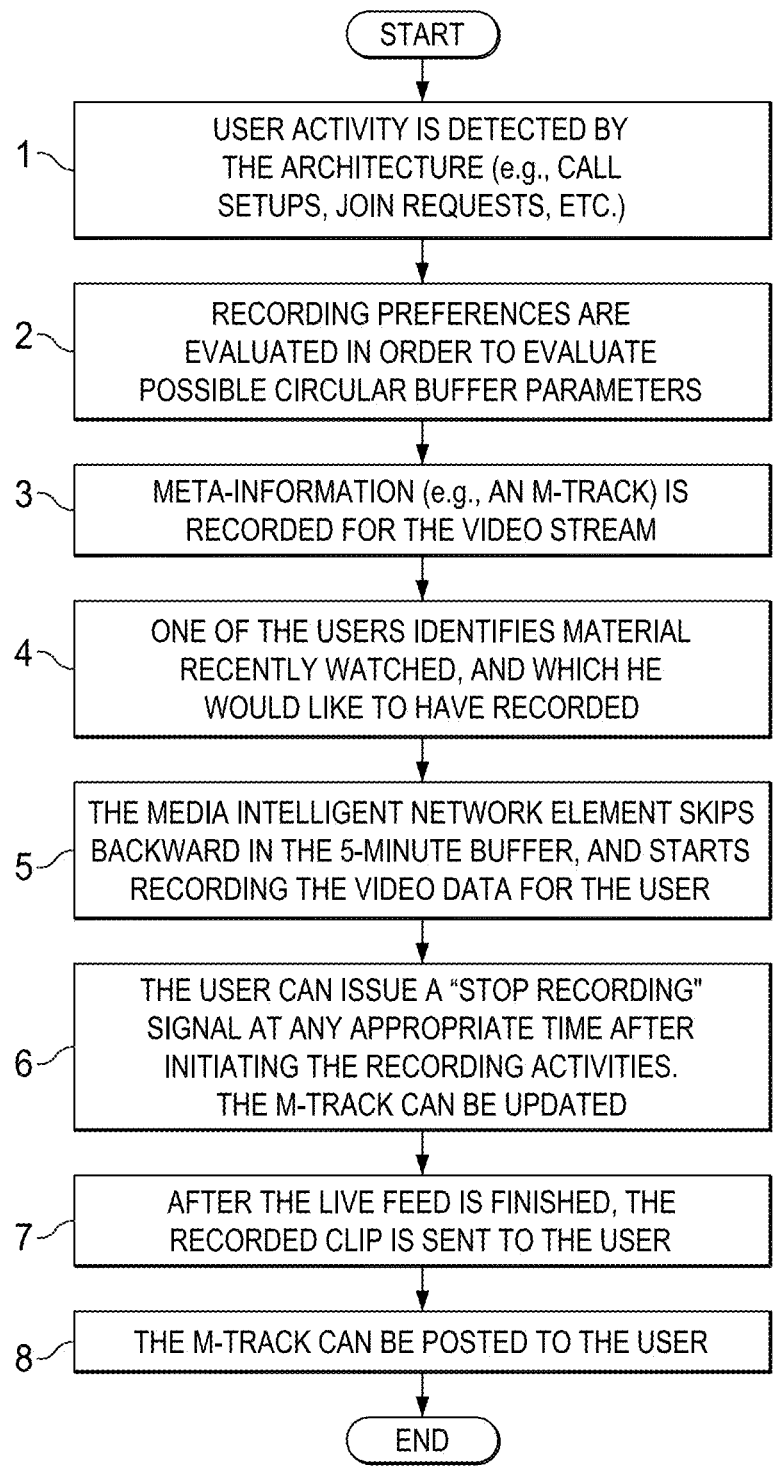

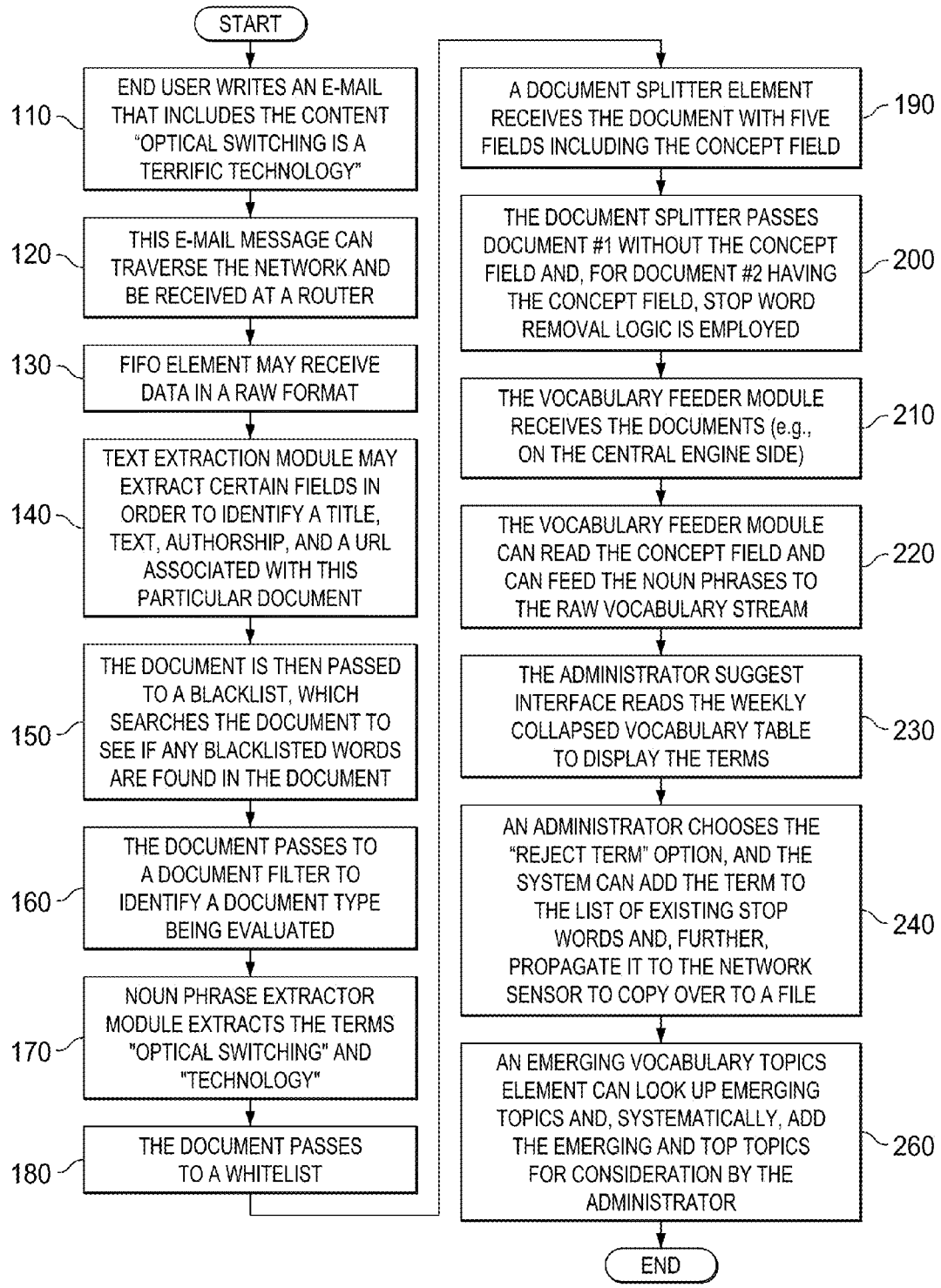

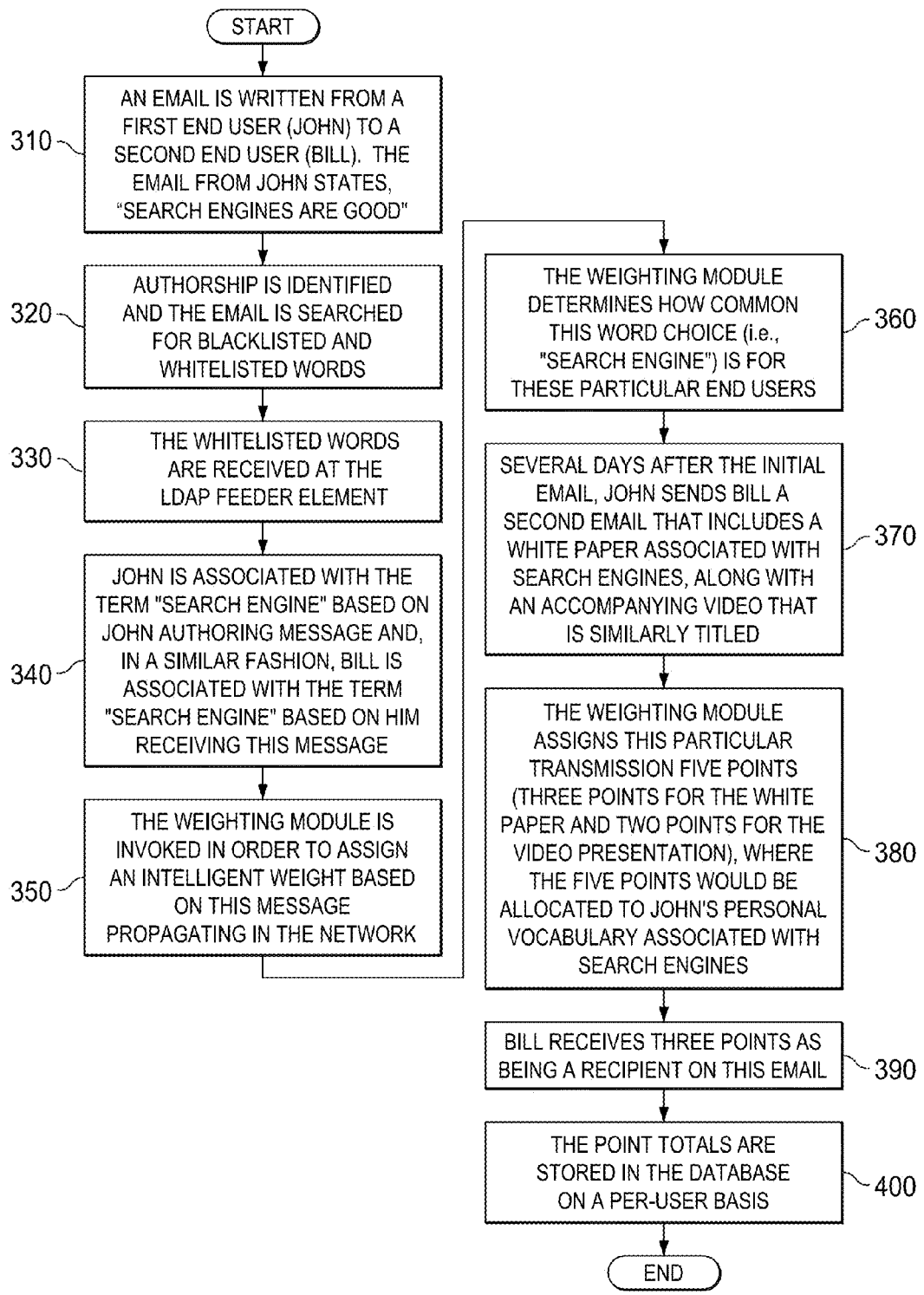

SYSTEM AND METHOD FOR MEDIA INTELLIGENT RECORDING IN A NETWORK ENVIRONMENT

TECHNICAL FIELD

This disclosure relates in general to the field of communications and, more particularly, to media intelligent recording in a network environment.

BACKGROUND

The field of communications has become increasingly important in today's society. In particular, the ability to effectively gather, associate, and organize information presents a significant obstacle for component manufacturers, system designers, and network operators. As new communication platforms and technologies become available, new protocols should be developed in order to optimize the use of these emerging protocols. Certain issues have arisen in scenarios in which users are unable to record videos that have significance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a simplified block diagram of a communication system for media intelligent recording in a network environment in accordance with one embodiment;

FIG. 2B is a simplified flowchart associated with one embodiment of the present disclosure;

FIG. 5 is a simplified flowchart illustrating a series of example activities associated with the communication system; and FIG. 6 is a simplified flowchart illustrating another series of example activities associated with the communication system.

DETAILED DESCRIPTION OF EXAMPLE EMBODIMENTS

Overview

Figure 2A:
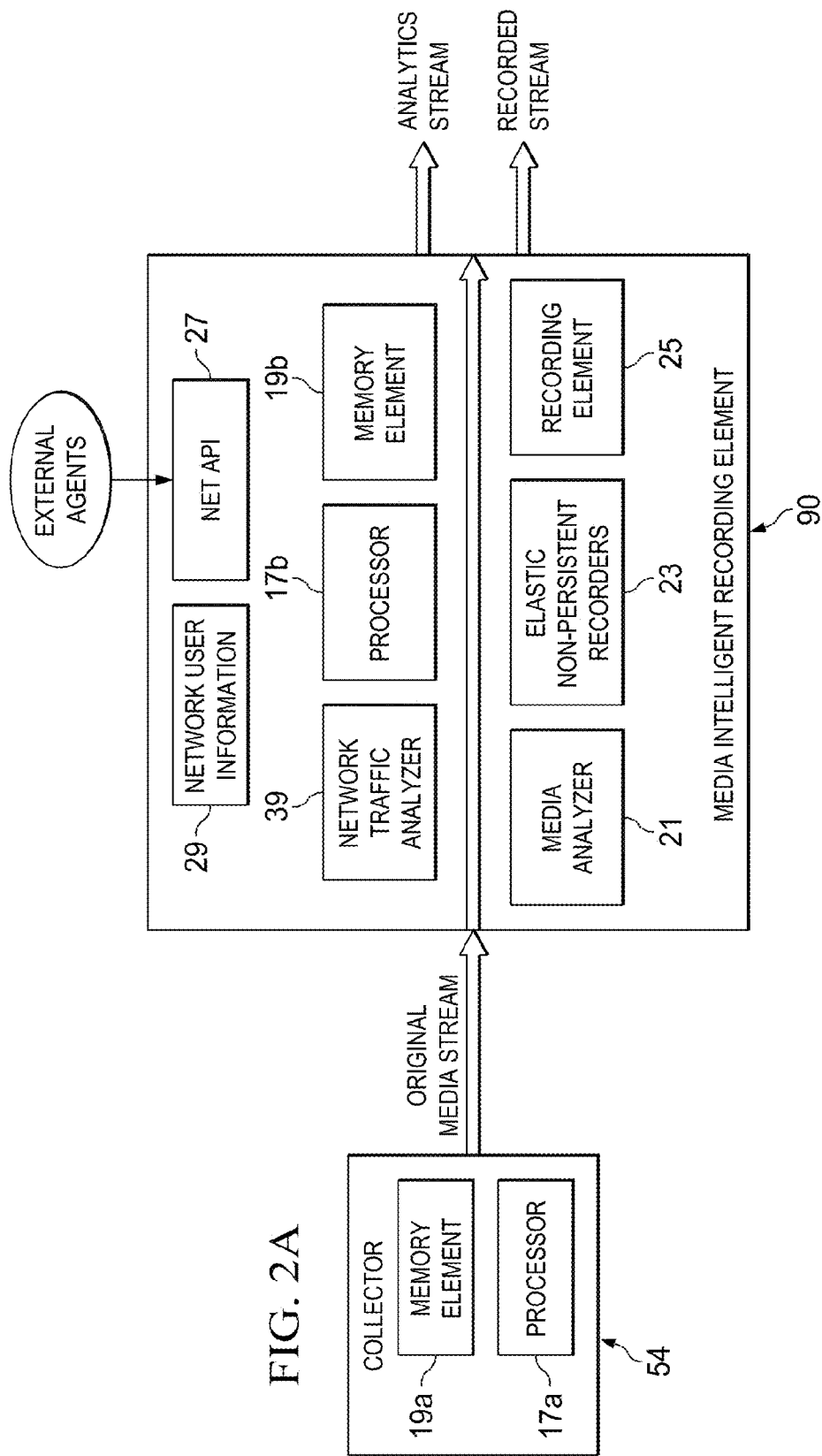
FIG. 2A is a simplified block diagram illustrating one possible implementation associated with providing media intelligent recording in accordance with one embodiment.

A method is provided in one example and includes receiving video data propagating in a network environment; maintaining the video data in a buffer having a predetermined size; generating meta-information associated with the video data; and receiving a recording request from an end user participating in a video session associated with a video data. The recording request triggers the video data to be recorded in the network environment remote from the end user.

A more specific instances, the meta-information includes optical character recognition (OCR) characteristics, speech to text characteristics, speaker recognition data, facial recognition characteristics, closed captioning information, and scene change information. Additionally, an application program interface (API) can be used to provide a command for recording the video data. In other examples, a wireless access protocol (WAP) is used to proxy certain video streams to be recorded.

Other implementations may include the buffer being a circular buffer that is hashed and that is reflective of a buffer timing preference of the end user. The architecture is configured for detecting activity of the end user based on call setup information for the video session, or a join request for the video session. In yet other embodiments, the method can include posting meta-information as an M-Track that describes various aspects of the video data that was recorded.

Example Embodiments

FIG. 1 is a simplified block diagram illustrating a communication system 10 configured to provide media intelligent recording in a network environment. In this particular implementation, a number of end users 12 are being represented as consumers, which have a suitable network connection to an Internet protocol (IP) network 18. A media intelligent recording element 90 is provisioned in IP network 18 at any suitable location. Also illustrated in FIG. 1 is a set of video sources 20a-d, which are representative of producers of any type of video content. For example, the producers can include videoconferencing platforms (E.G., Telepresence), enterprise video streams (e.g., an enterprise video portal), IPTV platforms, Internet video sources, unicast and multicast platforms, Skype activities, or any other element capable of generating video content.

In accordance with the teachings of the present disclosure, communication system 10 can provide two independent features for intelligently recording video data. First, a media stream flowing in the network can be automatically converted in to a meta-stream, which can be used for consumption at a later time. Second, individual end users can set up preferences in order to record any video data, or to record any part of live media that the user may be consuming.

Note that media traffic has grown exponentially, where employees are increasingly receiving their information through video. Due to this significant increase, it is incumbent on systems to allow for the intelligent consumption of video data. In contrast to blunt security systems that continuously record data, communication system 10 has the requisite intelligence to selectively record video information being watched. Additionally, communication system 10 is configured to extract/identify meta information of the same video data, which can foster better video consumption choices by end users. Hence, the architecture can allow end users to record live streaming content and, further, present the resulting meta track to the user for consideration.

Consider a simplistic example in which a given consumer (e.g., a manager of a technology business unit) is watching a video presentation. This particular video conference is reflective of a town hall meeting. The manager (Susan) is attending a live ('managers only') meeting hosted by the CEO of a company. In the most typical use case, Susan would be attending this meeting using her laptop (e.g., either through Windows Media Streaming, Flash Streaming, etc.). Note that in this example, Susan is not a participant in the video presentation (i.e., she did not receive any type of electronic INVITE, she is not the author, she is not electronically listed as part of an audience, etc.). Instead, Susan is a benign observer, who would not necessarily be able to intelligently record information. However, the recording aspect of the architecture is systematically evaluating traffic in an intelligent way, as it is network based. Hence, the architecture can operate at the network layer, and it can independently accommodate any incoming recording requests. This could allow an end user to record something on the fly: regardless of whether or not the user is a participant of that particular videoconference, meeting, etc.

In this instance, because Susan is a registered user, communication system 10 is configured to detect Susan, along with her IP address. Her recording preferences could have also been propagated and captured. In this particular case, her preferences indicate having a 5-minute skip buffer time setting. Because of this preference, media intelligent recording element 90 is configured to hold 5 minutes of the stream in a memory buffer (e.g., as part of a suitable elastic non-persistent recorder mechanism).

At some juncture during the video presentation, the presenter begins discussing materials that are significant for Susan. Susan also recognizes that this significant material should be sent to her team. However, sending a full video segment would not be efficient for the team, as only a few moments of that video segment has significance for these individuals. Susan can use an iPhone application to quickly send a record event to communication system 10. The recording element of media intelligent recording element 90 is configured to use the last 5 minutes of information being held in the buffer. The architecture would move ("flush") this information to a more persistent memory element and, subsequently, continue to record the video data until Susan issues a stop event (e.g., a stop command).

A short recorded clip of the video can be sent to Susan, where this clip is provided along with corresponding meta information (e.g., time, place, tags speakers, etc.). Hence, the architecture of communication system 10 is leveraging traffic inspection (e.g., identifying the user, her associated interactions, etc.) and, further, intelligently recording any suitable segment of video streams that the end user is inclined to record. [A number of more detailed examples are provided below with reference to additional FIGURES.]

A number of advantages can be achieved by employing media intelligent recording element 90 in the manner shown in FIG. 1. For example, recording intelligence is brought back into the network, which can avoid a traditional client-to-client, or client-to-server communication for recording media. Additionally, the architecture can readily generate meta markings of desired video streams, where such markings allow for enhanced media analytics. Further, the architecture provides users with the ability to record (and to possibly share) any media that is currently being consumed. In more particular implementations, the architecture can enable users to selectively consume media by offering/displaying the most recorded content. Hence, an individual can infer that the greater the number of people recording a given video stream, the higher the importance of the video file. In separate applications, individuals may also be able to proxy-watch a live event simply by directing the architecture to record at a designated time.

Turning to FIG. 2A, FIG. 2A includes a collector 54 and media intelligent recording element 90, which can receive an original media stream and produce an analytic stream, along with a recorded stream. A number of external agents are also shown in FIG. 2A, where such agents can have a logical coupling to a net application program interface (API) 27. A particular user can leverage any suitable agent (e.g., a laptop, an iPhone application, any suitable program, any piece of software, any smartphone mechanism, etc.) to send a recording request to the architecture.

Media intelligent recording element 90 may also include a recording element 25, elastic non-persistent recorders 23, a media analyzer 21, a network traffic analyzer 39, and network user information 29. Network user information 29 may include preferences (e.g., buffer timing preferences, video protocol preferences, etc.) for any given individual, or include policies applicable to the recording scenarios discussed herein. Additionally, both collector 54 and media intelligent recording element 90 can include a respective memory element 19*a-b* and a respective processor 17*a-b* in this particular implementation.

The architecture of FIG. 2A may include any number of persistent recording elements (e.g., elastic non-persistent reporters 23), which may be configured to record a live steam in response to the user initiating a record request. Additionally, recording element 25 is configured to track user activity intelligently. For example, a registered user can be watching IPTV, where his IP address can be identified as 172.16.254.1. In the example of FIG. 1, user #1 has registered his preferences such that certain H.264/AAC streams and Telepresence streams are to be recorded. Similarly, user #2 has registered his preferences such that IPTV and MPEG2-TS are not to be recorded. Additionally, protocols can be detected such that the media type is understood.

In a second aspect of the architecture, media flows are detected in the network, as they pass through a media analytic engine (e.g., media analyzer 21). Note that the actual media intelligent network recording device is not necessarily part of the call (i.e., it can monitor the call, but it is not meaningfully impacting overhead, adding to burdensome processing cycles, etc.). In at least one general sense, media intelligent recording element 90 is similar to a service insertion architecture (SIA), where streams propagate through the media intelligent network recording device, which performs nominal activities before allowing the streams to propagate to a next destination.

Note that any suitable agent can initiate a record request. For example, a command application program interface (API) can be configured to accomplish this objective. Net API 27 allows end users/applications to send commands such as "record now" and "stop now" in order to start and stop the recording of certain video content. In a particular example, out-of-band signaling can be used such that the underlying video data protocol (e.g., IPTV) is not necessarily involved in these recording requests.

In certain instances, a wireless access protocol (WAP) can be used to proxy certain video streams. In yet other examples, media intelligent recording element 90 is coupled to the local infrastructure (e.g., switches in a building). In such a scenario, media intelligent recording element 90 is not necessarily receiving live traffic, but receiving significant video traffic through a particular port.

Logistically, one or more buffers (e.g., a circular buffer) may be provisioned within elastic non-persistent recorders 23. The circular buffer is not necessarily recording information continuously and, instead, it is maintaining a certain amount of video data in memory (e.g., an elastic in transit recording element). The memory would consistently maintain the last 5 minutes of the video in anticipation of a potential recording request being sent by a given user. Similarly, video data could be released through the circular buffer (based on buffer fullness) when an incoming recording request is not received. Hence, based on the number of users active in the network and depending on their preferences, these memory elements can be active.

Additionally, the actual buffer implementation can be associated with a hashed buffer configuration. For example, if two users were watching the same presentation, the video data could be hashed into a single buffer as opposed to two buffers. Note that the maximum buffer size could be dictated by the greater of the two preferences of the two individual participants associated with this particular example video stream. In other example implementations, individual users would be provided with separate buffering queues in anticipation of possibly receiving a record request.

Note that when this video information is already residing in the circular buffer, the architecture can begin generating meta-information (e.g., any form of metadata, tagging data, attribute data, etc.), which may be included in a meta-track (M-Track) that provides this meta-information. Hence, analytics can be performed on the video stream as it propagates through media intelligent recording element 90. The meta-information can include optical character recognition (OCR), speech to text operations, speaker recognition, facial recognition, enterprise vocabulary, concept attributes, key word recognition, picture matching, subtitle/credits identification, volume peaks, authorship data, upload time, number of views, ratings, sections commented on, manual/automated tags, video playing source, viewing source, etc. or any other suitable attributes.

Hence, the media analytic engine is configured to provide meta-information of the media. Similarly, if that particular video stream entails some type of programming, then all applicable information can also be used (e.g., inclusive of closed captioning, venue information, published time data, etc.). Hence, a time coded analytic stream is being produced for each of the videos propagating through the architecture.

In one example, scene change information can also be intelligently tracked (e.g., at time T=1, there was a scene change; at T=24, there was an additional scene change). Note that this analytic activity can occur regardless of whether the video data is being recorded. If ultimately the video data is recorded, then this analytic information would be used to augment that recording. Hence, the analytic information could enhance characterizations of the recorded video for additional reference.

Turning to FIG. 2B, FIG. 2B is a simplified flowchart illustrating one possible set of example activities associated with the present disclosure. This particular flow may begin at step 1, where user activity is detected by the architecture. For example, call setups, join requests, etc. can be tracked by the architecture in order to evaluate the current status of a given individual. In some instances, this detection is conditioned on the users being registered through the platform. Hence, registration activities by the users allow for the previously outlined scenarios to function properly. A simple table can include mappings of preferences of individual users such that media intelligent recording element 90 understands which types of video traffic should be monitored for possible recording requests. To this end, network traffic analyzer 39 can be used to accomplish this objective. Separately, the mapping aspect may be performed using various mechanism such as that which is described in U.S. application Ser. No. 12/762,194, filed Apr. 16, 2010, by Thangavelu Arumugam, et al., entitled "SYSTEM AND METHOD FOR DEDUCING PRESENCE STATUS FROM NETWORK DATA," which is hereby incorporated by reference in its entirety.

At step 2, recording preferences are evaluated in order to evaluate possible circular buffer parameters. For example, depending on the recording preferences, media intelligent recording element 90 can maintain a 5-minute circular buffer of media (i.e., video) traffic. If there are no preferences indicated, then the system can automatically configure default circular buffer parameters.

At step 3, meta-information (e.g., an M-Track) is recorded for the video stream. This could include items such scene change information, OCR characteristics, speaker identification data, etc. At step 4, one of the users identifies material recently watched, and which he would like to have recorded. This particular user can leverage any suitable agent (e.g., a laptop, and iPhone application, etc.) to send a record request to the architecture.

At step 5, media intelligent recording element 90 skips backward in the 5-minute buffer, and starts recording the video data for the user. In certain example implementations, the actual user, who requested the recording feature, is suitably identified by the M-Track. At step 6, the user can issue a "stop recording" signal at any appropriate time after initiating the recording activities. Additionally, at this juncture, the M-Track can be updated. At step 7, after the live feed is finished (i.e., attendance by the user has been stopped, or the producer naturally finished the video), the recorded clip is sent to the user. At step 8, the M-Track can be posted to the user. This posting can offer more relevant information about the video clip, or the overall video itself (more generally). This information can include speaker identification, timestamp information, scene information, or any other suitable information, which may be of significance for this particular video.

Note that, in contrast to common DVR scenarios, the architecture of the present disclosure provides a set recording as a network service. This can be accomplished by, for example, using existing network infrastructure and adding a new recording controller. The network infrastructure can include using protocols such as a Web cache communication protocol (WCCP), which redirects traffic. In other instances, the network infrastructure can include transparent proxies (e.g., used in the Mobile Wireless Video Gateway case), or passive SPAN ports from network switches. In terms of video locality, the architecture can automatically find the nearest recording device based on the network topology. Similarly, the architecture can use the nearest recorder for searching for particular content using a search capability of the architecture.

Note that media sessions would not have to necessarily be routed via a proxy function in order for the recorder to insinuate itself in the session. As discussed herein, several networking protocols can be leveraged to address this issue (e.g., WCCP, hypertext transfer protocol (HTTP) redirects, etc.). Separately, privacy issues can be addressed through policy controls in the architecture. For example, a policy can outline that "if all participant's preference is to record then record." Other instances can involve a quorum number of participants being needed before proceeding to record (and/or distribute). Additionally, each recording can be tagged with a video fingerprint (e.g., either based on frames, time, or scenes) via the M-Track. This information can be stored as a meta information stream, in the recording itself, etc.

Figure 3A:
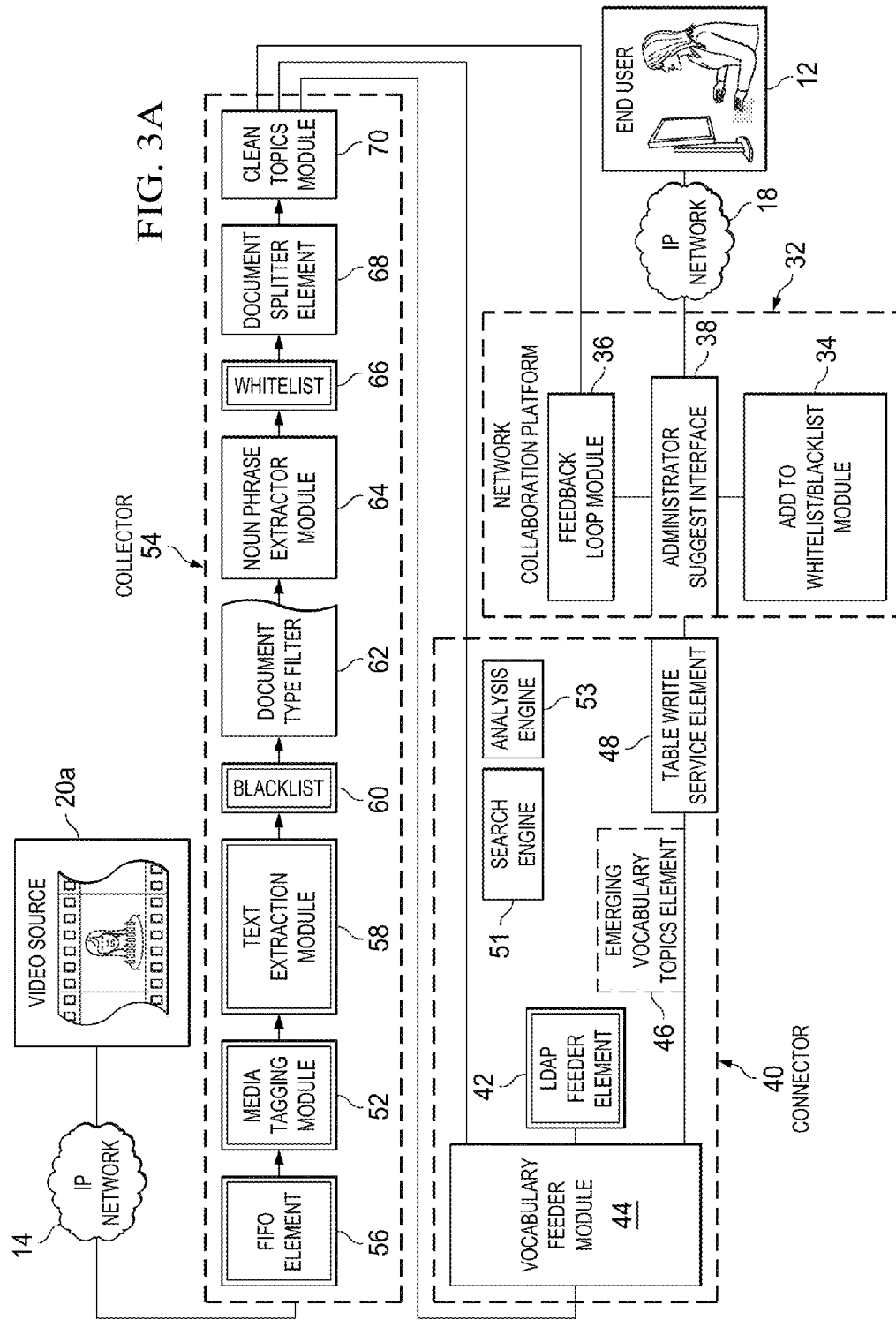
FIG. 3A is a simplified block diagram illustrating one possible implementation associated with the present disclosure.

Turning to FIG. 3A, FIG. 3A is a simplified block diagram illustrating one possible implementation of communication system 10. In this particular example, video source 20*a* interfaces with the architecture through an IP network 14. Communication system 10 may further include a network collaboration platform (NCP) 32, which includes an add to whitelist/blacklist module 34, a feedback loop module 36, and an administrator suggest interface 38. FIG. 3A illustrates a connector 40, which includes a lightweight directory access protocol (LDAP) feeder element 42, a vocabulary feeder module 44, an emerging vocabulary topics element 46, and a table write service element 48. Connector 40 may also include a search engine 51 and an analysis engine 53.

FIG. 3A may also include collector 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple collectors 54 may be provisioned at various places within the network, where such provisioning may be based on how much information is sought to be tagged, the capacity of various network elements, etc.

Figure 3B:
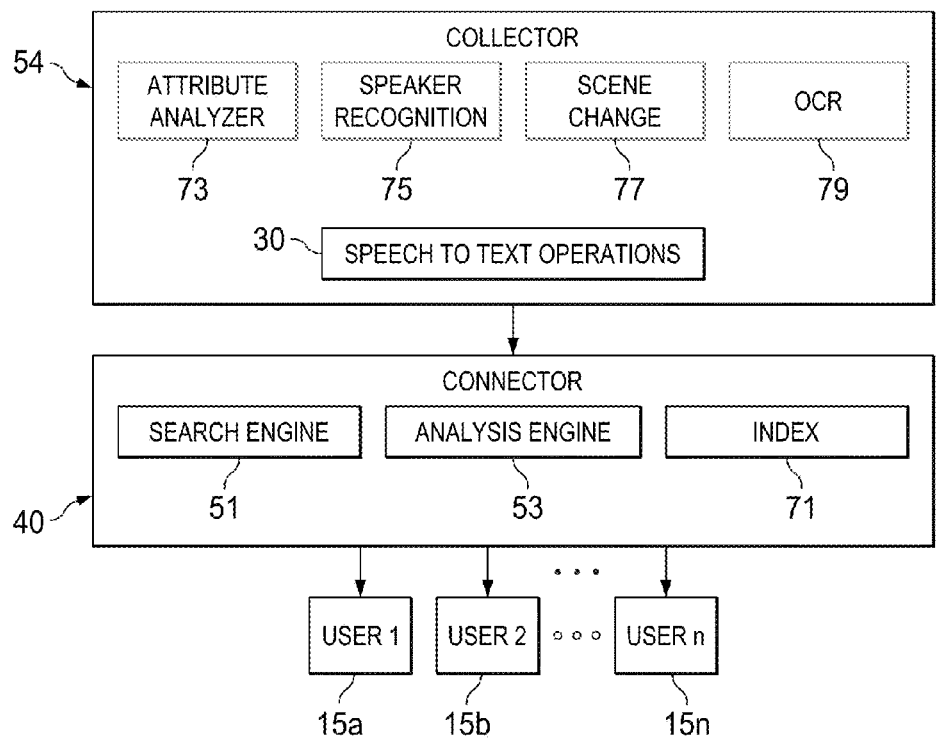
FIG. 3B is a simplified block diagram illustrating another possible implementation associated with present disclosure.

Turning to FIG. 3B, this particular example includes multiple users 15a-n, along with collector 54 and connector 40. This particular example reflects a marking framework associated with providing meta-information for the recorded video. FIG. 3B could include a video server being coupled to collector 54, which includes an attribute analyzer 73, a speaker recognition element 75, a speech to text operations element 30, a scene change 77, and an optical character recognition (OCR) element 79. Also illustrated in FIG. 3B is connector 40, which can include search engine 51, analysis engine 53, and an index 71. Video information can be evaluated to provide a set of meta-information to be reviewed by a given end user. Note that the term 'meta' as used herein in this Specification is intended to include any type of designation, description, labeling, characterization, attribute, etc. that may be indicative of certain characteristics associated with a video file (inclusive of the contents and/or individual segments within the video file).

In operation, the architecture of the present disclosure can collect video data (e.g., via collector 54) that may be originating from network traffic, from a video server, from a video repository, or from any other suitable location. The videos can be recorded in real-time, or suitably uploaded by any appropriate entity (e.g., by employees, administrators, outside personnel, etc.) in order to create a video library in an enterprise environment.

Video data can be systematically evaluated and tagged in order to characterize the video data based on its attributes. Further, this information can be fed into a framework (e.g., an algorithm within connector 40) to provide augmented information about the aspects of the associated video.

For example, attribute analyzer 73 (e.g., provisioned in collector 54) can evaluate incoming packets, and then forward those packets onto other modules that further characterize the video data (e.g., identify the speaker at speaker recognition 75, identify the location of the video at scene change 77, perform speech to text operations, identify the scene changes in the video, identify when was the video uploaded, etc.). In one example implementation, these modules can perform parallel processing that can be aggregated into (a common) index 71, which can be fed to search engine 51. Search engine 51 can be used to return appropriate results for end users querying the architecture for particular video files. Hence, after the information is extracted from the video, analysis engine 53 can be used in order to determine the characteristics of the video (e.g., where such operations may be performed at connector 40). Index 71 can contain data about each segment of each video in the system, information about the company, industry and people (supplied by the administrator), as well as the preferences, vocabularies, and histories of each user using the system.

Logistically, in employing speaker recognition techniques, the platform can not only identify the speakers within a video, but the timestamps as participants start and stop speaking. Once this information is collected, the platform can identify the percentage of speaking time for each speaker. Based on the information above, basic video classification can be achieved (e.g., video #1 was identified as including two speakers, where the first speaker's speech was tracked at 65%, while the second speaker's speech was tracked at 25%, and the remainder represented silence, or no speech). Additionally, such data can prove helpful in making stronger baseline assumptions (e.g., such as this video being associated with an interview). In another example, video #2 could be identified as only comprising a single speaker in which that speaker's speech time was tracked at 95%. Such a video file can be associated with a directive from one individual (e.g., an executive) to a group of audience members. Such inferences allow the platform to better classify videos.

Note that additional attributes such as whether the speaker is a celebrity, an industry veteran, a new executive addition to a company, etc. enables the platform to collect additional information. Moreover, such personality types can be personalized for each user based on his/her 'speaker interests' (where this personalization can be identified via a combination of network tagging data of user activity, and by enabling a "follow person A" capability within the platform). Further, recognizing whether a video is a demonstration (demo), training materials, or a tutorial helps to alert the user about characteristics of the video file (i.e., the meta-information).

Hence, one feature of communication system 10 addresses identifying these factors within a video file and, subsequently, informing the user of these attributes that may be contained in meta-information. Another feature includes alerting the user of the attributes in order to empower the user to make a calculated decision about which videos should be watched. These features are amenable to accommodating end user preferences such that significant information is consumed by employees (as intended) without disturbing the current flow of work.

After completing facial recognition and/or speaker identification activities, the architecture can readily identify timestamps associated with when the speakers start and stop speaking. The architecture can also identify whether the speaker is the user himself or someone of significance to the user. Moreover, identifying whether the viewer knows a speaker (or is interested in the speaker) can be based on the enterprise directory information, email contact groups, social networking based relationship maps, people belonging to the same functional program, workplace relationships, etc. For example, users may wish to see sections of the video having people from their immediate team (directory reporting structure), everyday coworkers (directory+email contact list), someone they work with closely (email contacts+email tagging+network based relationship maps), from their external groups (mailing lists), etc. Another protocol for accomplishing this objective can involve offering an explicit option for users to decide whom they would like to view as part of their preferences. Hence, the architecture is configured to match the identified speakers of the video to the viewer's database of preferred people and, further, alert the user about video file sections that display a match.

In the case of speech recognition, phrases such as "Let me introduce Ms. XYZ," "Let's welcome ABC," "We have among us DEF", etc. can be extracted to match these names to the list of the viewer's preferred people. If no match were identified, then an incoming request can be matched to the general industry icon list to see if there is any worthy match to suggest to the user. Additionally, text identification can extract names from banners welcoming celebrities, or information can be gleaned from placards that identify panelists, from video credits, from sub-titles within a video, from closed-caption streams, etc. Any such places within a video can reveal the identity of speakers, which can be matched to a predefined celebrity list to enable recipients of video files to make intelligent decisions about which files should be watched.

The architecture can also intelligently identify objects, backgrounds, and/or background noise. Videos that may demand the user's visual attention can be associated with video files having no audio, no speech, or speech in the form of a song. Such videos commonly have a slideshow in a video format, where the user may have no other choice than to halt his/her current work to watch the video. For scene detection activities, if there is a significant change between two video frames and, further, if this delta is consistent for multiple frames, such information can point toward a change in background or a visual change that signifies a video file needing visual attention (or it could be indicative of a PowerPoint).

In certain aspects of the present disclosure, communication system 10 permits end users to rate one or sections of a video file (e.g., as "must watch," "not worth watching", or any other labeling that would be indicative of the value of watching a particular video (or its internal segments)). Moreover, collecting these ratings across various users (e.g., over a period of time) can be used by analysis engine 53 to recommend which videos (or sections of videos) should be viewed. In other implementations, such indicators could be as simple as a "thumbs up/thumbs down" soft button (or a slider, or other interactive control), where the user is invited to make a selection depending on their level of engagement.

Other features associated with communications system 10 involve intelligently tracking various forms of user engagement, while watching a specific video file. For example, automatic data gathering for particular sections of the video can occur such that the architecture evaluates when individuals are breaking from their multitasking routines to refocus their attentions on watching a video file. For example, the architecture can track: sections skipped (start time and end time); sections rewound, replayed; sections fast forwarded; speed of fast forward; playback window activity (resize, bring to front or back, etc.); activity in other windows (typing, mouse clicks, etc.); playback volume up or down; action committed after video viewing is finished (e.g., if a webpage where opened, if an e-mail was sent, if a bookmark where created, etc.) etc. This data about the engagement and behavior of previous viewers of a video can be powerful indicators of which segments future users may consider highly visually worthy.

Turning to the infrastructure of FIG. 3A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that the elements of FIG. 3A-3B can readily be part of a server in certain embodiments of this architecture. In one example implementation, collector 54, connector 40, and/or NCP 32 are (or are part of) network elements that facilitate or otherwise helps coordinate the media intelligent recording operations, as explained herein. As used herein in this Specification, the term 'network element' is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Note that each of collector 54, connector 40, and/or NCP 32 can be provisioned with their own dedicated processors and memory elements (not shown), or alternatively the processors and memory elements may be shared by collector 54, connector 40, and NCP 32.

In one example implementation, connector 40 and/or collector 54 includes software (e.g., as part of search engine 51, analysis engine 53, attribute analyzer 73, etc.) to achieve the media intelligent recording operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 3A may include any suitable algorithms, hardware, software, components, modules, interfaces, or objects that facilitate media intelligent recording operations. Additional operational capabilities of communication system 10 are detailed below.

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, an administrator can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer an administrator the results generated by communication system 10.

Figure 3C:
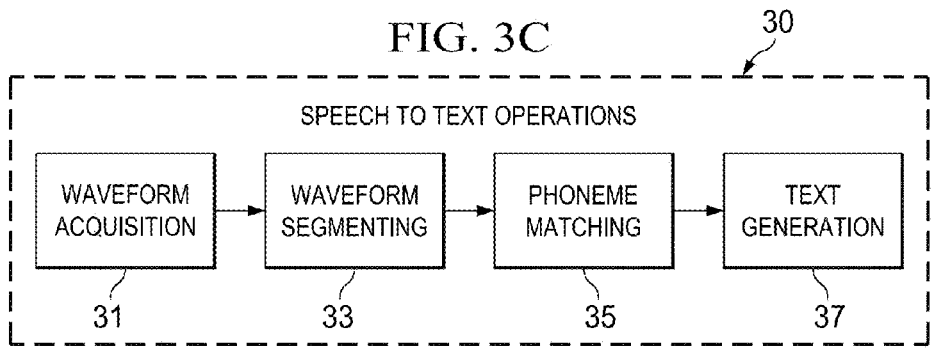
FIG. 3C is a simplified schematic diagram of speech-to-text operations that can be performed in the communication system in accordance with one embodiment.

Turning to FIG. 3C, FIG. 3C is a simplified schematic diagram illustrating a number of speech-to-text operations 30 that may occur within communication system 10. In one implementation, the speech-to-text operations 39 areis this part of text extraction module 58. FIG. 3C includes a waveform acquisition element 31, a waveform segmenting element 33, a phoneme matching element 35, and a text generation element 37. The speech-to-text conversion can include a number of stages. For example, the waveform acquisition can sample the analog audio waveform. The waveform segmentation can break the waveform into individual phonemes (e.g., eliminating laughter, coughing, various background noises, etc.). Phoneme matching can assign a symbolic representation to the phoneme waveform (e.g., using some type of phonetic alphabet). In addition, the text generation can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which require some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

Figure 3D:
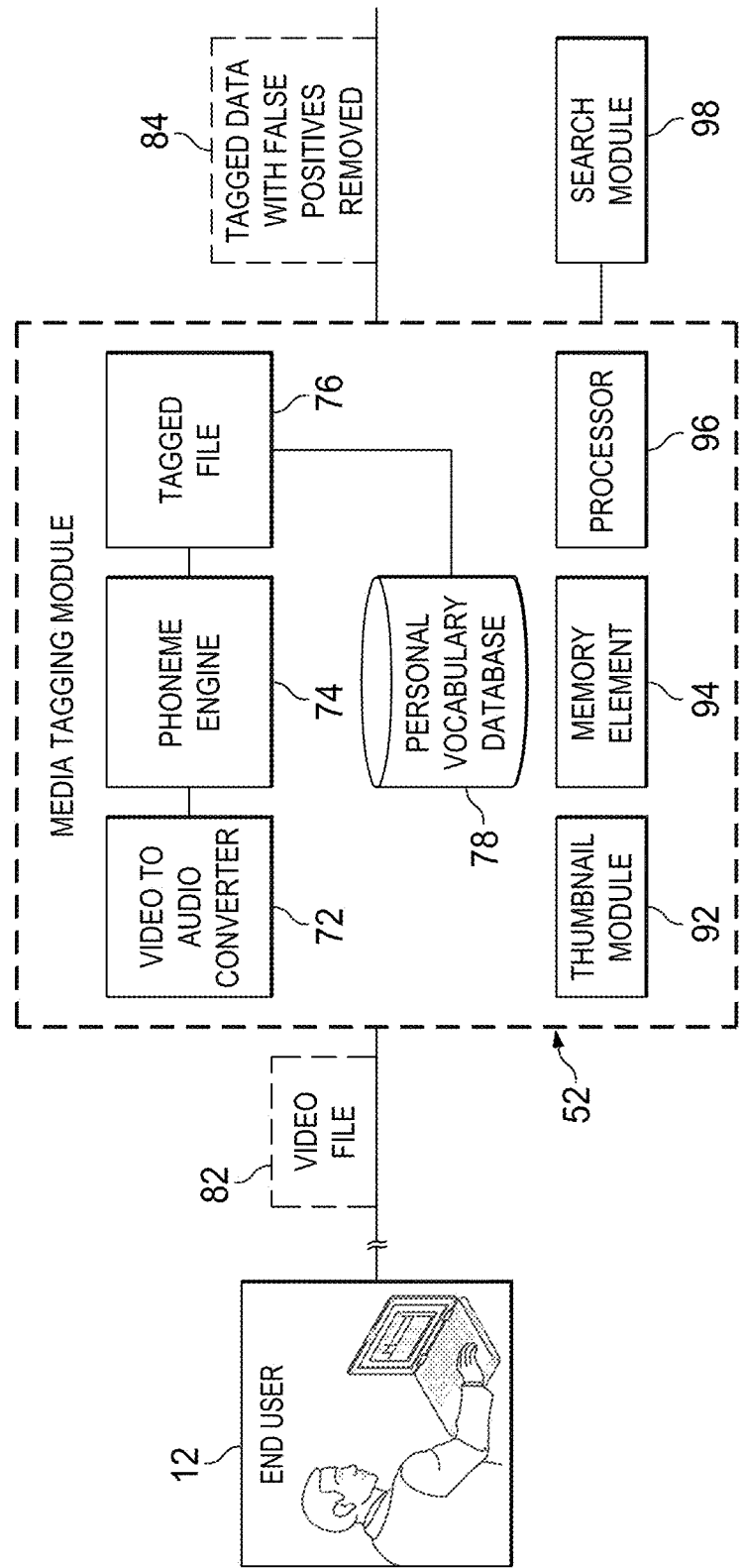
FIG. 3D is a simplified block diagram of a media tagging module in the communication system in accordance with one embodiment.

FIG. 3D is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 94, a processor 96, and a personal vocabulary database 78. A raw video file 82 can be sought to be uploaded by end user 12, and it can propagate through media tagging module 52 in order to generate tagged data with false positives removed 84. Additionally, a search module 98 is also provided in FIG. 3D and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, Quick Time (QT) VCD, MP4, DVD, etc. Thumbnail module 92 can store one or more thumbnails on a platform that connects individual end users. The platform could be (for example) used in the context of searching for particular types of information collected by the system.

Figure 4:
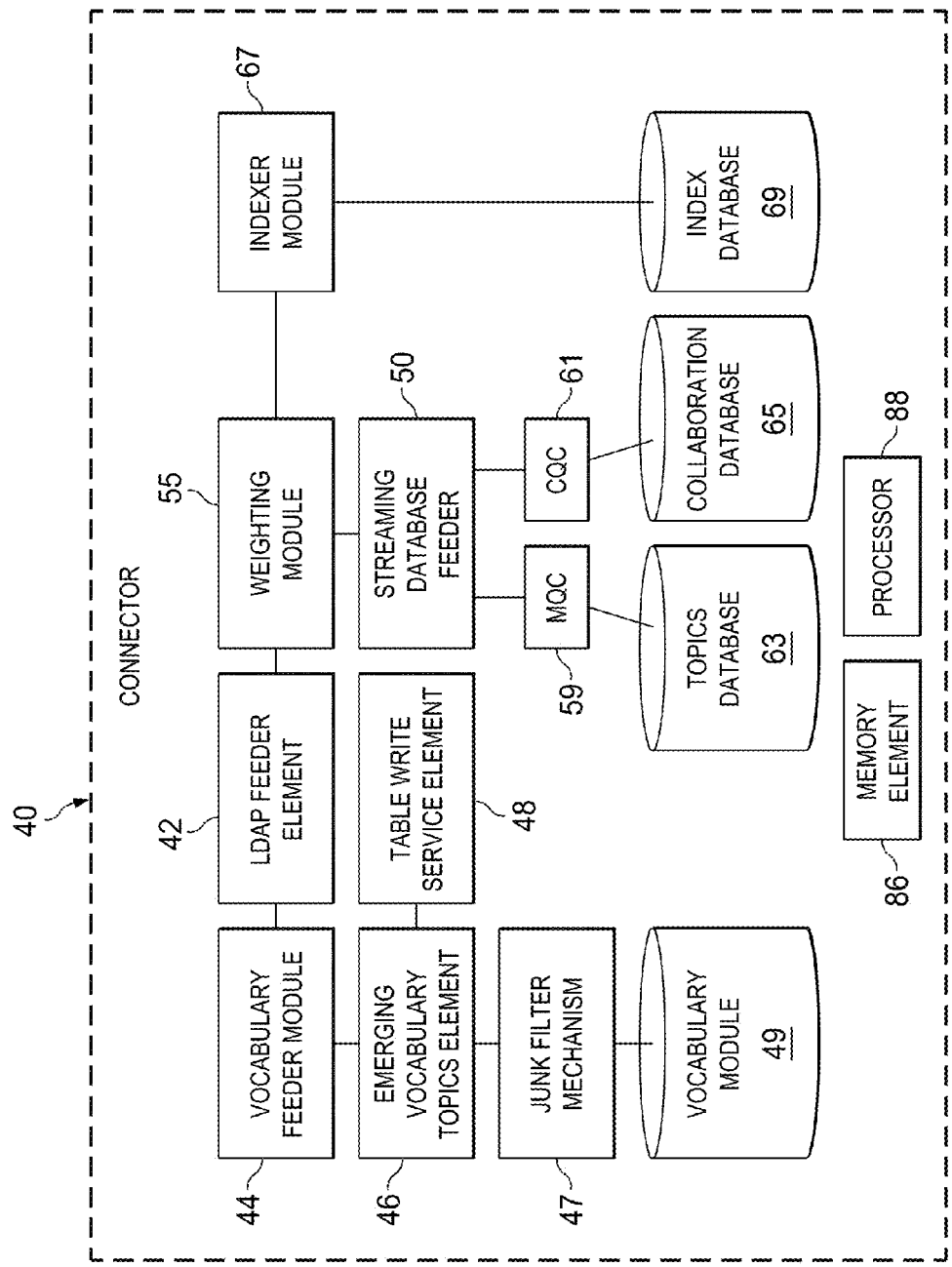
FIG. 4 is a simplified block diagram of a connector in the communication system in accordance with one embodiment.

Turning to technical details related to how the personal vocabulary is developed, FIG. 4 is a simplified block diagram of an example implementation of connector 40. Connector 40 includes a memory element 86 and a processor 88 in this particular configuration. Connector 40 also includes a junk filter mechanism 47 (which may be tasked with removing erroneous vocabulary items), a vocabulary module 49, a weighting module 55, a streaming database feeder 50, a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user. Along similar reasoning, topics database 63 can store words associated with particular topics identified within the personal vocabulary. Collaboration database 65 can involve multiple end users (e.g., along with an administrator) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 4. It is imperative to note that this example of FIG. 4 is merely representing one of many possible configurations that connector 40 could have. Other permutations are clearly within the broad scope of the tendered disclosure.

In operation of a simplified example used for discussion purposes, the extraction and processing operations can be performed on collector 54, where those results may be provided to connector 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. In addition, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on connector 40 (e.g., this could make implementation of the feedback loop more efficient). In other instances, the stop word removal feature is placed on collector 54 so that only the filtered fields are sent over to connector 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag all user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

FIGS. 5-6 offer two distinct workflows for communication system 10. FIG. 5 addresses the corporate vocabulary formation, whereas FIG. 5 addresses the personal vocabulary development. It should also be noted that these illustrations are associated with more typical flows involving simplistic documents propagating in a network (e.g., email, word processing documents, PDFs, etc.).

FIG. 5 is a simplified flowchart illustrating one example operation associated with communication system 10. In this particular flow, at step 110, end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). This is reflected by step 120. Collector 54 can be provisioned at such a location in order to capture data and/or facilitate the identification of content, as described herein.

In this particular example, FIFO element 56 may receive data in a raw format at step 130. Text extraction module 58 may extract certain fields in order to identify a title, text, authorship, and a uniform resource locator (URL) associated with this particular document at step 140. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by an administrator based on particular user needs. The term 'whitelist' as used herein in this Specification is meant to connote any data sought to be targeted for inclusion into the resultant composite of words for an administrator. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to an administrator.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 170.

Once this document has propagated through noun phrase extractor module 64, the document passes to whitelist 66 at step 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at step 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 200. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the connector side) at step 210. Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of connector 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 5, vocabulary feeder module 44 can read the concept field (e.g., created by the NLP module) and can feed the noun phrases to the raw vocabulary stream (e.g., "raw_vocab_stream" file) at step 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 230. This element also suggests the top (e.g., 'n') words to an administrator for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to collector 54 to copy over to a file (e.g., adminStopWords.txt). This is reflected by step 240. Network collaboration platform 32 can create a file from the table suggested vocabulary terms (e.g., via commands including suggestedby=system, and status=rejected). This file can be a part of the force sync files that can be pushed to the collector/connector (depending on where the stop words mechanism resides). At step 260, emerging vocabulary topics element 46 can look up emerging topics (e.g., within harvested documents) and, systematically, add the emerging and top topics to the architecture for the administrator to consider. Both options can be provided to an administrator. The emerging topics can be similar to the experience tags such that topics growing in prominence over a given time interval (e.g., a week) can be suggested to an administrator.

FIG. 6 is a simplified flowchart illustrating one example operation associated with communication system 10. In this particular flow, an email is written from a first end user (John) to a second end user (Bill) at step 310. The email from John states, "Search engines are good" and this is evaluated in the following ways. First, authorship is identified and the email is searched for blacklisted and whitelisted words at step 320. In essence, a number of text stripping operations occur for the received document (as outlined previously above in FIG. 5). Second, the whitelisted words are received at LDAP feeder element 42 at step 330. In one sense, the appropriate concept has been extracted from this email, where insignificant words have been effectively stripped from the message and are not considered further.

At step 340, John is associated with the term "search engine" based on John authoring message and, in a similar fashion, Bill is associated with the term "search engine" based on him receiving this message. Note that there is a different weight associated with John authoring this message, and Bill simply receiving it. At step 350, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

In addition, and as reflected by step 360, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, several days after the initial email, John sends Bill a second email that includes a white paper associated with search engines, along with an accompanying video that is similarly titled. This is reflected by step 370. Connector 40 has the intelligence to understand that a higher weight should be accorded to this subsequent transmission. Intuitively, the system can understand that certain formats (White Papers, video presentations, etc.) are more meaningful in terms of associating captured words with particular subject areas. At step 380, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, and at step 390, Bill receives three points as being a recipient on this email. At step 400, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest can be identified. In this particular example, the personal vocabulary being exchanged between the groups reveals a common interest in the subject of deep packet inspection.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building and media intelligent recording functionality can be provided at various locations. In one example implementation, this software is resident in a network element, such as connector 40, NCP 32, and/or collector 54, or in another network element for which this capability is relegated. In other examples, this could involve combining connector 40, NCP 32, and/or collector 54 with an application server or a gateway, or some proprietary element, which could be provided in (or be proximate to) these identified network elements, or this could be provided in any other device being used in a given network. In one specific instance, connector 40 provides the personal vocabulary building features explained herein, while collector 54 can be configured to offer the media intelligent recording activities detailed herein. In such an implementation, collector 54 can initially receive the data, employ its media tagging functions, and then send the results to a text extraction mechanism, which can develop or otherwise process this information such that a media intelligent recording is generated.

In other embodiments, the media intelligent recording features may be provided externally to collector 54, NCP 32, and/or connector 40, or included in some other network device, or in a computer to achieve these intended functionalities. As identified previously, a network element can include software to achieve the media intelligent recording and vocabulary building operations, as outlined herein in this document. In certain example implementations, the media intelligent recording and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and media intelligent recording operations as outlined herein. Additionally, each of these devices may include a processor that can execute software or an algorithm to perform the vocabulary building and media intelligent recording activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 3A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

Additionally, although Telepresence and IPTV architectures have been discussed herein, these are just examples of all the many video platforms that could benefit from the teachings of the present disclosure. All such possibilities are clearly within the broad scope of the present disclosure. Accordingly, the examples provided should not limit the scope or inhibit the broad teachings of communication system 10 as potentially applied to a myriad of other architectures. Additionally, many of the activities being described herein can be accommodated in collector 54. For example, collector 54 can be provisioned in conjunction with media intelligent recording element 90 (e.g., at any appropriate location in the network as a single device).

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for providing video data recording in a network environment, comprising:
   receiving video data propagating in the network environment;
   maintaining the video data in a buffer having a predetermined size, wherein:
      the buffer is a circular buffer that is to be hashed and shared between a first end user and a second end user, both end users participating in a video session associated with the video data;
      the predetermined size of the buffer corresponds to a buffer timing recording preference of the first end user specifying a duration of video data to be maintained in the buffer, wherein the buffer timing recording preference of the first end user specifies a longer duration of video data than a duration of video data specified by the buffer timing recording preference of the second end user;
   generating meta-information associated with the video data while the video data is residing in the circular buffer; and
   receiving a recording request from one of the two end user participating in a video session associated with a video data, wherein the recording request triggers the video data to be recorded in the network environment remote from the end user by moving the video data from the circular buffer to another memory element that is more persistent than the circular buffer.

2. The method of claim 1, wherein the meta-information includes a selected one of a group of elements, the group consisting of:
   a) optical character recognition (OCR) characteristics;
   b) speech to text characteristics;
   c) speaker recognition data;
   d) facial recognition characteristics;
   e) closed captioning information; and
   f) scene change information.

3. The method of claim 1, wherein an application program interface (API) is used to provide a command for recording the video data.

4. The method of claim 1, wherein a wireless access protocol (WAP) is used to proxy certain video streams to be recorded.

5. The method of claim 1, wherein the video data that recorded is provided as a network service.

6. The method of claim 1, further comprising:
   detecting activity of the first end user and the second end user based on call setup information for the video session, or a join request for the video session.

7. The method of claim 1, further comprising:
   posting meta-information as an M-Track that describes certain aspects of the video data that was recorded.

8. One or more non-transitory computer readable media that includes code for execution and when executed by a processor is operable to perform operations for providing video data recording in a network environment, said operations comprising:
   receiving video data propagating in the network environment;
   maintaining the video data in a buffer having a predetermined size, wherein:
      the buffer is a circular buffer that is to be hashed and shared between a first end user and a second end user, both end users participating in a video session associated with the video data;
      the predetermined size of the buffer corresponds to a buffer timing recording preference of the first end user specifying a duration of video data to be maintained in the buffer, wherein the buffer timing recording preference of the first end user specifies a longer duration of video data than a duration of video data specified by the buffer timing recording preference of the second end user;
   generating meta-information associated with the video data while the video data is residing in the circular buffer; and
   receiving a recording request from one of the two end user participating in a video session associated with a video data, wherein the recording request triggers the video data to be recorded in the network environment remote from the end user by moving the video data from the circular buffer to another memory element that is more persistent than the circular buffer.

9. The one or more non-transitory computer readable media of claim 8, wherein the meta-information includes a selected one of a group of elements, the group consisting of:
   a) optical character recognition (OCR) characteristics;
   b) speech to text characteristics;
   c) speaker recognition data;
   d) facial recognition characteristics;
   e) closed captioning information; and
   f) scene change information.

10. The one or more non-transitory computer readable media of claim 8, wherein an application program interface (API) is used to provide a command for recording the video data.

11. The one or more non-transitory computer readable media of claim 8, wherein a wireless access protocol (WAP) is used to proxy certain video streams to be recorded.

12. The one or more non-transitory computer readable media of claim 8, wherein the video data that recorded is provided as a network service.

13. The one or more non-transitory computer readable media of claim 8, the operations further comprising:
   detecting activity of the first end user and the second end user based on call setup information for the video session, or a join request for the video session.

14. The one or more non-transitory computer readable media of claim 8, the operations further comprising:
   posting meta-information as an M-Track that describes certain aspects of the video data that was recorded.

15. An apparatus for providing video data recording in a network environment, said apparatus comprising:
- a memory element configured to store data;
- a processor operable to execute instructions associated with the data;
- a recording element configured to interface with the memory element and the processor such that the apparatus is configured for:
  - receiving video data propagating in the network environment;
  - maintaining the video data in a buffer having a predetermined size, wherein:
    - the buffer is a circular buffer that is to be hashed and shared between a first end user and a second end user, both end users participating in a video session associated with the video data;
    - the predetermined size of the buffer corresponds to a buffer timing recording preference of the first end user specifying a duration of video data to be maintained in the buffer, wherein the buffer timing recording preference of the first end user specifies a longer duration of video data than a duration of video data specified by the buffer timing recording preference of the second end user;
  - generating meta-information associated with the video data while the video data is residing in the circular buffer; and
  - receiving a recording request from one of the two end user participating in a video session associated with a video data, wherein the recording request triggers the video data to be recorded in the network environment remote from the end user by moving the video data from the circular buffer to another memory element that is more persistent than the circular buffer.

16. The apparatus of claim 15, wherein an application program interface (API) is used to provide a command for recording the video data.

17. The apparatus of claim 15, wherein a wireless access protocol (WAP) is used to proxy certain video streams to be recorded.

18. The apparatus of claim 15, wherein the video data that recorded is provided as a network service.

19. The apparatus of claim 15, wherein activity of the first end user and the second end user is detected based on call setup information for the video session, or a join request for the video session.

20. The apparatus of claim 15, wherein meta-information is posted as an M-Track that describes certain aspects of the video data that was recorded.

* * * * *